July 16, 1935.    R. L. TRIPLETT    2,007,989
AUDION TUBE TESTER
Original Filed Jan. 11, 1932   2 Sheets-Sheet 1
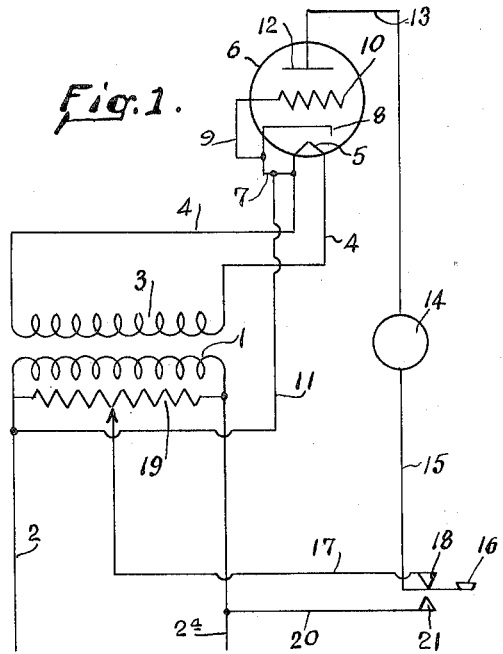
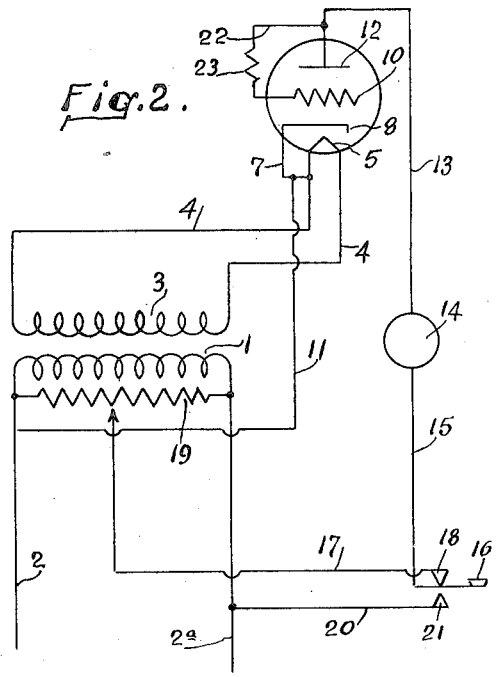
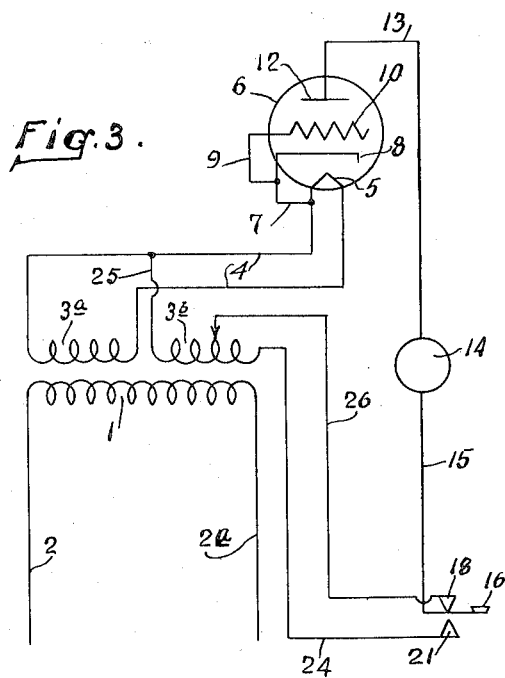
Inventor
RAY L. TRIPLETT,
By Toulmin & Toulmin
Attorneys July 16, 1935. R. L. TRIPLETT 2,007,989
AUDION TUBE TESTER
Original Filed Jan. 11, 1932  2 Sheets-Sheet 2
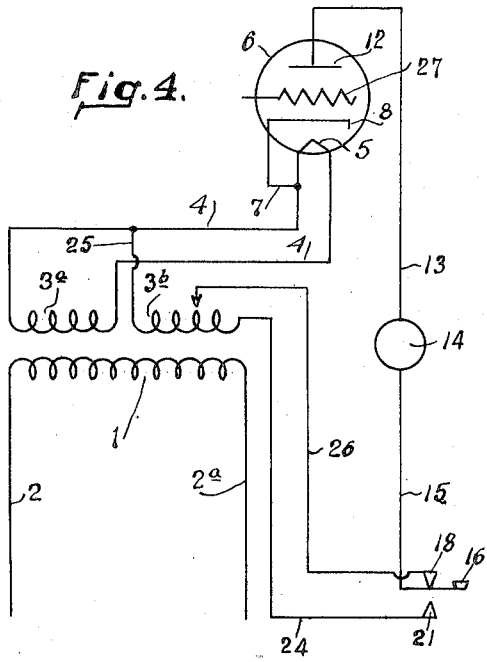
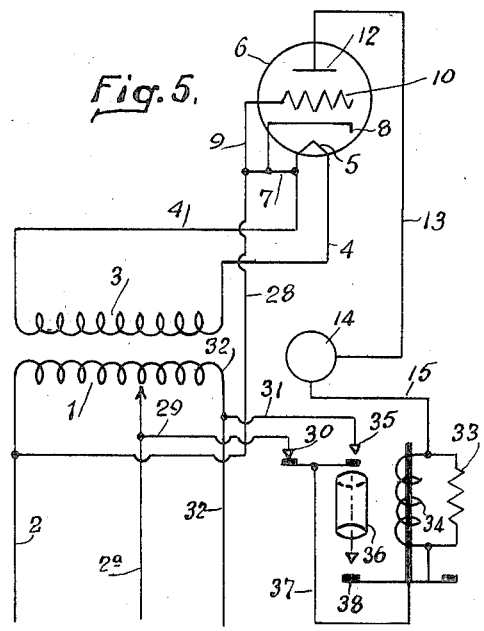
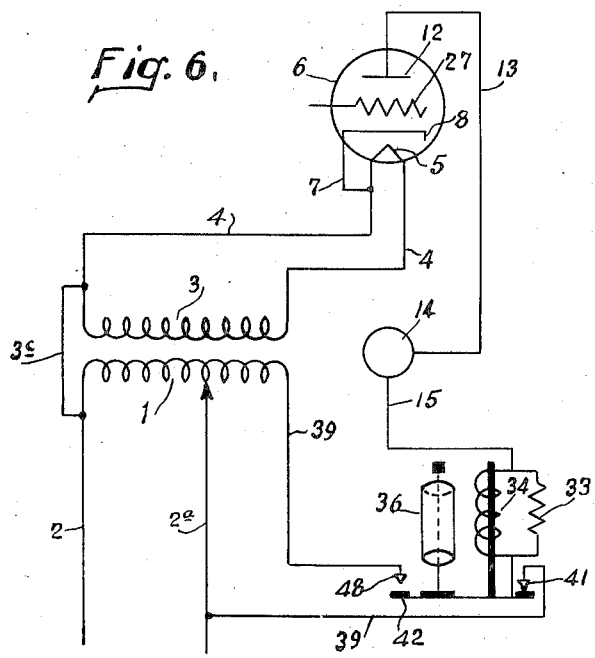
Inventor
RAY L. TRIPLETT,
By Toulmin & Toulmin
Attorneys Patented July 16, 1935

2,007,989

UNITED STATES PATENT OFFICE 2,007,989

AUDION TUBE TESTER

Ray L. Triplett, Bluffton, Ohio

Original application January 11, 1932, Serial No. 585,937. Divided and this application March 13, 1933, Serial No. 660,560

8 Claims. (Cl. 250—27)

This invention relates to a method of and apparatus for testing vacuum tubes, and particularly to methods and apparatus in which an alternating current source may be employed to energize all of the circuits of the tube.

Audion tubes are usually tested by applying different voltages to the grid and determining the mutual conductance of the tube by measuring the change in the plate current caused by the different grid voltages. In tubes of this kind the electron flow is increased or decreased within defined limits by change of voltages applied to the various elements. Electrons are attracted to the plate within a certain definite limit determined by the current through the filament and the bias voltages upon the grid. Hence, within certain limits, the conductance of the tube may be determined by varying the plate voltage, the initial voltages applied to the other tube elements remaining unchanged.

In audion tubes the electron flow may be increased or decreased within defined limits by different voltages applied to the various elements. The electrons are attracted to the plate within specified limits, as the plate voltage becomes more positive. Hence, within certain limits the conductance of a tube may be determined by varying only the plate voltage, while the initial voltages applied to the other tube elements remain unchanged. By measuring the conductance of the tube under different conditions of plate voltage the worth of a tube can be obtained.

It is my object to maintain the input into the tube or the grid conditions the same, and to change the applied potential of the output or plate circuit, and measuring the plate current with the two or more applied potentials and subtracting the difference to determine the value of the tube. In other words, by having a standard grid and filament condition and varying the plate condition I can determine the value of the tube.

This application is a division of my copending application, Ser. No. 585,937, filed January 11, 1932.

In the present drawings preferred embodiments of this invention are shown.

Figure 1 is a form of a circuit diagram of an alternating current tube tester, in which the voltage of the plate current is varied by means of a potentiometer across the primary coil of a transformer.

Figure 2 is a view similar to Figure 1 with the grid connected into the plate circuit.

Figure 3 is another circuit diagram of an alternating current tube tester, in which the primary coil of a transformer is connected across the source of an alternating current and in which there is one secondary coil connected to the filament and another connected to the plate circuit.

Figure 4 is a view similar to Figure 3, showing a floating grid forming a part of this secondary circuit connected into the plate circuit.

Figure 5 is a view showing an alternating current tube tester, with means added thereto for automatically changing the applied potential of the plate circuit.

Figure 6 is a view similar to Figure 5 but showing a floating grid.

The numeral 1 is used to designate the primary of a transformer, which is connected across the source of an alternating current by means of conductors 2 and 2a. The secondary 3 of the transformer is connected by means of conductors 4 to a filament 5 of an audion tube 6. Extending from one end of the conductors 4 is a conductor 7, which forms an electrical connection between one of the conductors 4 and the intermediate grid 8 of the audion tube. By means of the conductor 9 the grid 10 is connected to the conductor 7.

Extending from the conductor 7 to the conductor 9 is a conductor 11. The numeral 12 designates the plate of the tube, which has connected thereto a conductor 13 extending from the plate to a milliammeter 14, which is connected by a conductor 15 to a switch 16. This switch normally makes contact with a contact point 18, at one end of a conductor 17, the other end of which conductor is adapted to be adjusted along a potentiometer 19 for varying the voltage applied to the tube and through the plate circuit. The potentiometer is connected across the two conductors 2 and 2a. Extending from the conductor 2a is a conductor 20, which has on one end thereof a contact point 21 adapted to be engaged by the switch 16 when it is pressed down.

When the parts are in the position shown in Figure 1 a certain definite voltage is applied to the plate current. By shifting the point of contact of the conductor 17 along the potentiometer the voltage may be varied and the resulting variations in the current may be determined by the milliammeter. During these voltage variations the voltages applied to the grid and to the filament remain constant and unchanged.

In the form shown in Figure 2 the grid 10 is connected to the conductor 13 by means of a conductor 22, which has a resistance 23 therein. In this form a variable voltage is applied to the plate circuit by shifting the point of contact between the conductor 17 and the potentiometer 19, and pressing the switch 16 to engage the contact point 21.

In the form shown in Figure 4 the secondary of the transformer is divided into two branches, 3a and 3b, branch 3a being connected to the filament by means of conductors 4, the same as in the other forms. The branch 3b is connected at one end to one of the conductors 4 by a conductor 25, and at its other end by means of a conductor 24 to the contact point 21. From the contact point 18 of Figure 4 a conductor 26 extends to the secondary 3b. In this form there is a floating grid 27.

With the switch in the position shown in Figures 3 and 4 a certain definite potentiality is applied to the plate 12 and to the plate circuit. This may be varied by varying the connection between the conductor 26 and the coil of the secondary 3b of the transformer. This voltage may also be varied by pressing the switch down so as to contact with the contact point 21. When the switch 16 contacts with the point 21 the whole of the voltage of the coil of the secondary 3b is applied to the plate circuit. The voltage may be varied from the whole voltage of this coil to any definite determined part thereof. The variations in the plate currents, due to the variations in the voltages of the plate circuit, are determined by the milliammeter 14.

In the forms shown in Figures 5 and 6 there is an automatic means for varying the voltage through the plate circuit. In this form the transformer has its usual two coils 1 and 3. The secondary is connected to the filament and the grid, as in the form shown in Figure 1, with the exception that in Figure 6 there is a floating grid. In Figure 5 the conductor 28 extends from the conductor 2 of the primary coil of the transformer to the conductors 7 and 9 so that this conductor 28 is a part of the plate circuit through the tube.

To the conductor 2a of the primary coil of the transformer is attached one end of a conductor 29, which has on its other end a contact 30. The conductor 2a may have its connection with the primary coil varied so as to produce an increased voltage passing through the plate circuit. Extending from one end of the primary coil of the transformer is a conductor 32, which has extending therefrom a conductor 31 with a contact 35 on the end thereof.

In the forms shown in Figures 5 and 6 the conductor 15 has attached thereto a relay 34 with a shunt 33. 36 is a barrel plunger.

When the parts are in the position shown in Figure 5 the current will pass from the primary circuit of the transformer, through the conductors 29 and 37, relay 34, conductors 15 and 13, through the plate circuit. The action of the circuit through the relay will cause the arm member 38 to elevate the barrel plunger so that a contact is made between the point 35 and the conductor 37, breaking the contact at the point 30 so that the current will pass through the conductors 32, 31 and 37, and through the plate circuit, thereby increasing the voltage. The resulting current changes, due to the voltage changes, will be read from the milliammeter.

In the form shown in Figure 6 there is a floating grid 27. In this form the primary of the transformer is connected to the secondary of the transformer by means of a conductor 3c. In this form the wire extending from one end of the primary of the transformer has thereon a contact 40. Extending from the conductor 2a of the primary of the transformer is a conductor 39, which has on one end a contact 41.

In the position the parts occupy as shown in Figure 6 the current will pass through the conductor 39, relay 34, conductors 15 and 13, through the plate circuit. Through the operation of the relay 34 the contact at the point 41 is broken. The barrel plunger 36 is elevated so that a contact is formed between the contact member 42 and the contact point 40. The current now passes through the conductor 39, through the relay 34, conductors 15 and 13, through the tube plate circuit.

By the arrangement shown in Figures 5 and 6, a greater voltage is applied to the plate circuit than that which is passing through the primary of the transformer. This is a means by which the voltage is varied upwardly. The change in the voltage is effected automatically, and the corresponding current changes are indicated by the milliammeter.

It will be understood that it is desired to comprehend within my invention such modifications as come within the scope of my claims and my invention.

Having thus fully described my invention, what I claim as new and desire to secure by Letters Patent, is:

1. The method of determining the plate resistance of an audion tube, producing an induced secondary current from a primary current, energizing the filament and the grid of said tube by said induced current, applying a definite voltage to the plate circuit from the primary current, automatically varying the voltage applied to the plate circuit of the tube by the voltage applied, and determining the current variation due to the voltage variation.

2. The method of determining the plate resistance of an audion tube which consists in energizing the filament and grid by a current induced by another current, applying a definite voltage from the other current to the plate of the tube, automatically varying the voltage of the plate by the voltage applied, and measuring the plate current corresponding to each voltage.

3. In an audion tube tester, in combination with an electrical connection between a source of alternating current and an audion tube, means to energize the filament from said source, means to energize the plate circuit, automatic means actuated by the plate voltage to vary the plate voltage, and means to indicate the difference in the plate current condition.

4. In an audion tube tester, in combination with a source of alternating current, means to apply to the tube filament and grid from said source a constant voltage, automatic means actuated by the voltage to apply to the tube plate from said source a variable voltage, and means to indicate the difference in the plate current condition.

5. In combination in a testing instrument for audion tubes, an audion tube having a filament, grid and plate, a source of current having the primary of a transformer therein, a transformer whose secondary is inserted with the filament and grid of said tube, a measuring instrument in circuit with said plate, means of applying varying potentials on said plate comprising a switch and means for insertion upon the operation of said switch a portion of the primary of said transformer in the plate circuit, and an automatic electrically operated means in said plate circuit for actuating said switch.

6. In combination in a testing instrument for audion tubes, an audion tube having a filament, grid and plate, a source of current having the primary of a transformer therein, a transformer whose secondary is inserted with the filament and grid of said tube, a measuring instrument in circuit with said plate, means of applying varying potentials on said plate comprising a switch and means for insertion upon the operation of said switch a portion of the primary of said transformer in the plate circuit, an automatic electrically operated means in said plate circuit for actuating said switch, and a delay dash-pot for regulating the movement of said switch when so operated.

7. The method of testing audion tubes which comprises energizing the filament circuit and the grid circuit from a source of constant voltage, impressing upon the plate circuit a definite determined voltage, automatically changing by the impressed voltage the voltage to another definite determined voltage, and indicating the different currents in the plate circuit.

8. The method of testing audion tubes which comprises energizing the filament and the grid circuits from an alternating current source, impressing upon the plate circuit a definite determined alternating voltage, automatically changing the impressed voltage through the action of the impressed voltage, and indicating the magnitude of the plate currents.

RAY L. TRIPLETT.